United States Patent
Iraschko

(10) Patent No.: US 8,596,423 B2
(45) Date of Patent: Dec. 3, 2013

(54) ADJUSTING DEVICE FOR A DISC BRAKE

(75) Inventor: Johann Iraschko, Schweitenkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 242 days.

(21) Appl. No.: 13/069,965

(22) Filed: Mar. 23, 2011

(65) Prior Publication Data
US 2011/0203882 A1 Aug. 25, 2011

Related U.S. Application Data

(63) Continuation of application No. PCT/EP2009/006858, filed on Sep. 23, 2009.

(30) Foreign Application Priority Data

Sep. 26, 2008 (DE) ...................... 10 2008 048 922.0

(51) Int. Cl.
*F16D 65/14* (2006.01)

(52) U.S. Cl.
USPC .................................. 188/71.8; 188/196 BA

(58) Field of Classification Search
USPC ..................................... 188/196 BA
See application file for complete search history.

(56) References Cited

U.S. PATENT DOCUMENTS

| 3,900,084 | A | * | 8/1975 | Farr | 188/196 F |
| 4,399,894 | A | * | 8/1983 | Tribe | 188/71.9 |
| 5,353,896 | A | * | 10/1994 | Baumgartner et al. | 188/71.9 |
| 6,213,255 | B1 | * | 4/2001 | Neuwirth | 188/71.9 |
| 7,066,491 | B2 | * | 6/2006 | Kittler et al. | 280/777 |
| 7,484,602 | B2 | * | 2/2009 | Iraschko et al. | 188/196 BA |
| 7,614,483 | B2 | | 11/2009 | Klingner et al. | |
| 7,926,626 | B2 | * | 4/2011 | Iraschko | 188/72.7 |
| 8,469,160 | B2 | * | 6/2013 | Iraschko et al. | 188/196 BA |
| 2007/0068745 | A1 | * | 3/2007 | Klingner et al. | 188/71.7 |
| 2007/0221459 | A1 | * | 9/2007 | Kobelev et al. | 188/322.19 |
| 2008/0217125 | A1 | * | 9/2008 | Iraschko | 188/196 BA |
| 2011/0155518 | A1 | * | 6/2011 | Iraschko | 188/71.8 |
| 2011/0203883 | A1 | * | 8/2011 | Iraschko et al. | 188/71.8 |
| 2011/0203884 | A1 | * | 8/2011 | Iraschko et al. | 188/71.8 |

FOREIGN PATENT DOCUMENTS

| DE | 10 2005 005 250 A1 | 9/2005 |
| DE | 10 2006 007 684 A1 | 8/2007 |

OTHER PUBLICATIONS

International Search Report dated Feb. 24, 2010 including English-language translation (four (4) pages).

\* cited by examiner

*Primary Examiner* — Thomas Irvin
(74) *Attorney, Agent, or Firm* — Crowell & Moring LLP

(57) ABSTRACT

An adjusting device is provided for adjusting wear of brake pads and a brake disc of a pneumatically actuated disc brake, having a rotary lever-actuated application device. The adjusting device is insertable into an adjusting spindle of the disc brake and attached to a brake caliper of the disc brake by way of a bearing disc. A drive ring is axially disposed on a bushing of a powershift/overload clutch. The powershift/overload clutch is axially disposed between the drive ring and a clutch sleeve for a spring. The clutch sleeve has a sleeve and a clutch insert that may be axially inserted into the sleeve in a positively engaged manner.

18 Claims, 3 Drawing Sheets

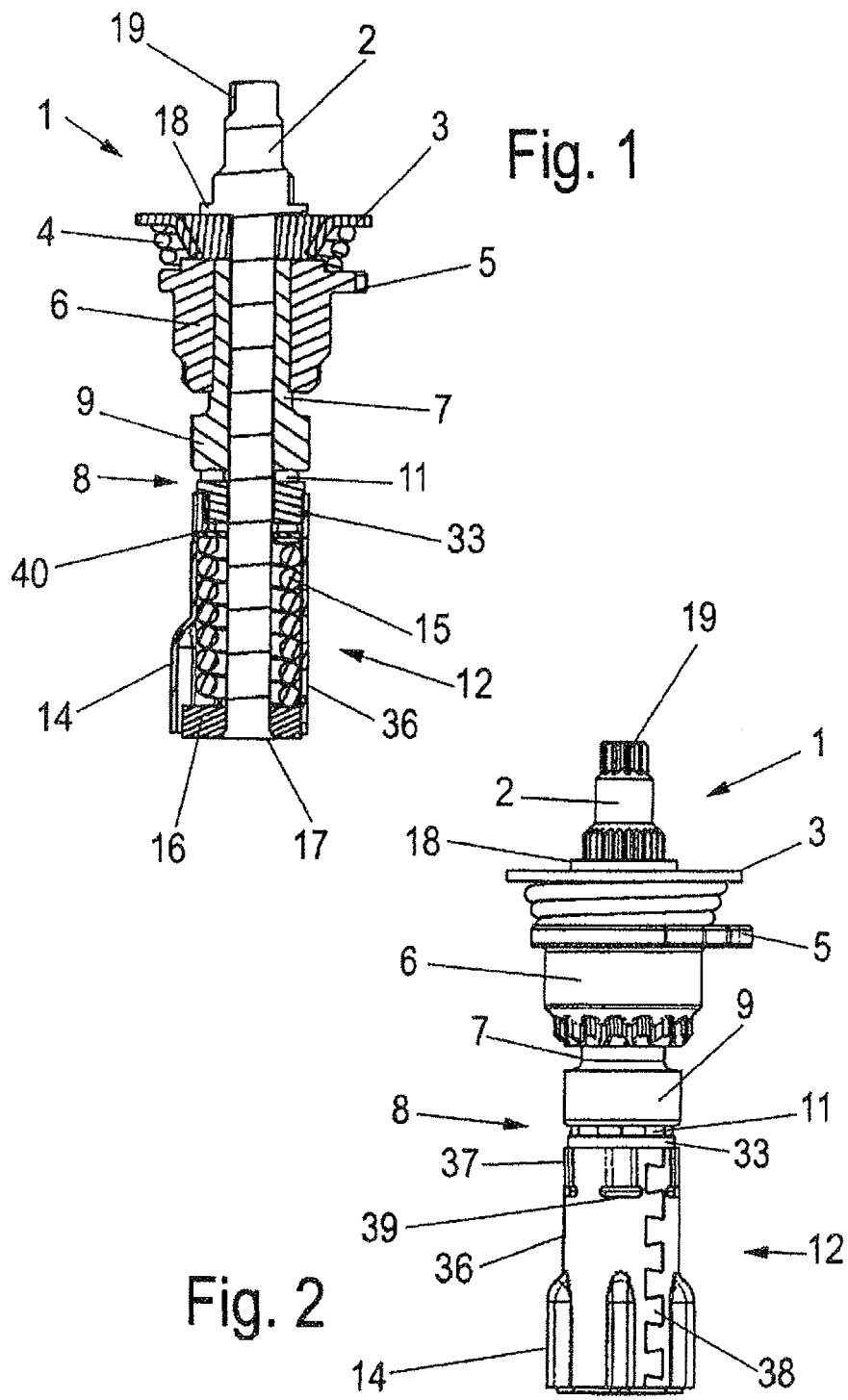

"Related Art"

ADJUSTING DEVICE FOR A DISC BRAKE

CROSS-REFERENCE TO RELATED APPLICATIONS

This application is a continuation of PCT International Application No. PCT/EP2009/006858, filed Sep. 23, 2009, which claims priority under 35 U.S.C. §119 from German Patent Application No. DE 10 2008 048 922.0, filed Sep. 26, 2008, the entire disclosures of which are herein expressly incorporated by reference.

BACKGROUND AND SUMMARY OF THE INVENTION

The invention relates to an adjusting device for a disc brake and, in particular, to an adjusting device for a pneumatically actuated disc brake.

There are various embodiments of adjusting devices for disc brakes. Thus, for example, there are adjusting devices for pneumatically actuated disc brakes, especially those designed with sliding calipers, and also for pneumatically actuated fixed- or hinged-caliper disc brakes.

Pneumatically actuated disc brakes are now part of the standard equipment of heavy commercial vehicles. To produce the required application force, disc brakes of this kind require mechanical multiplication since the force of the pneumatically operated brake cylinders is limited owing to the pressure level (currently about 10 bar) and the limited size of the brake cylinders. In the case of currently known pneumatically actuated disc brakes, there are multiplication ratios of between 10:1 and 20:1. The piston strokes of the brake cylinders are between 50 and 75 mm, giving an application travel of about 4 mm for pressing the brake pads against the brake disc.

The thickness of the friction material of the brake pads is in a range of 20 mm. Since two pads are required, this results in a wear-related travel of about 40 mm, without taking into account disc wear. This travel is many times greater than the application travel mentioned above. There is therefore a need to adjust the brake according to pad wear by means of a device. The prior art is an automatic wear adjuster, the effect achieved being that the "release clearance", i.e. the gap between the brake pads and the brake disc in the unactuated state, is held constant irrespective of the state of wear and wear behavior of the brake pads.

Disc brakes that have an adjuster are very often found in commercial vehicles, such adjusters being disposed concentrically in the cavity of a threaded spindle and being driven eccentrically by way of a drive element (e.g. operating finger, gearwheel) by the brake lever.

A known adjusting device 1 of this type is illustrated in FIG. 4. It consists essentially of the following functional elements: shaft 2 with drive spigot 19 for a resetting tool; bearing washer 3 for fixing on a disc brake; compression spring 4 between bearing washer 3 and operating fork 5; operating fork 5 with drive ring 6; load-changeable/overload clutch 8; clutch sleeve 12; and spring 15.

During a braking operation, the brake lever coupled to the piston rod of the brake cylinder performs a rotary motion. Before the rotary motion of the lever is introduced into the adjusting device 1 by way of the coupling mechanism of the adjuster (e.g. operating fork 5 and operating finger or gearwheels), an "idle travel" has to be overcome. This travel is decisive for the size of the release clearance since the adjuster is not activated during this movement, and the application travel thus represents the release clearance. Once this idle travel has been overcome, the adjusting device 1 is set in rotary motion, and an adjusting process is initiated by virtue of the coupling with the threaded spindle or tube via the clutch sleeve 12.

One important element of the adjusting device 1 is the "clutch sleeve" 12. As described above, this is used to transmit the rotary motion of the adjusting device 1 to the "threaded spindle or tube." In the existing adjusting device 1 in accordance with FIG. 4, this clutch sleeve 12 is embodied integrally with a sleeve body 13. It has two essential functional sections: at one end, the clutch sleeve 12 has a clutch section 10 with pockets to accommodate balls 11 which, together with a clutch bushing 9, form the load-changeable/overload clutch 8 in the form of a "ball ramp clutch".

The end remote from the clutch sleeve 12 has ribs 14 extending in the axial direction, which are used to transmit the torque to the threaded tube. In the cavity of the clutch sleeve 12 is a spring 15, in particular a cylindrical spring, which is used to preload the ball ramp clutch 8. The cylindrical spring can be supported on a profiled washer 16, which is held by a lip of the shaft 2, and on the clutch section 10. Owing to installation space conditions, the clutch sleeve 12 must be embodied with relatively thin walls. On the other hand, the clutch section 10 must have a greater wall thickness at the end in the region of the ball ramp pockets in order to ensure that the ball pockets have sufficient strength.

Experience has shown that this component is relatively difficult to produce and that the fatigue strength of this component can be impaired in the event of small deviations in the process. As part of higher requirements as regards economy of manufacture and quality (maintenance intervals) in combination with minimum possible installation space and increased strength, there is a requirement for an improved adjusting device.

It is therefore the object of the present invention to provide an improved adjusting device.

This and other objects are achieved by an adjusting device, as well as a disc brake having such an adjusting device, for compensating wear of the brake pads and brake disc of a pneumatically actuated disc brake having a rotary lever-actuated application device, which adjusting device can preferably be inserted into an actuating spindle of the disc brake and attached to a brake caliper of the disc brake by way of a bearing washer, wherein a drive ring is disposed axially on a bushing of a load-changeable/overload clutch. The load-changeable/overload clutch is disposed axially between the drive ring and a clutch sleeve for a spring. The clutch sleeve has a sleeve and a clutch insert that can be inserted axially into the sleeve in a positively engaged manner.

In accordance therewith, such an adjusting device makes it possible significantly to simplify the production of the clutch sleeve and considerably to reduce the sensitivity thereof to process fluctuations.

By virtue of the fact that the clutch sleeve is constructed from two functional components, namely a sleeve and a clutch insert, these two components can be produced by using the most economical methods and with the best-quality results for each component. The clutch insert can be inserted in a simple manner into the sleeve, and it can be connected to the latter in a positively engaged and non-rotatable manner by way of suitable corresponding profiles.

This design has the following advantages:

(1) use of optimum production methods for the decoupled functional components: sintering or cold extrusion for the clutch insert and sheet metal forming for the sleeve, for example;

(2) improved economy over the prior art through a wider choice of suppliers and optimized production processes; and (3) increased robustness through the use of appropriate manufacturing methods for each of the two different components.

In a preferred embodiment, the load-changeable/overload clutch is designed as a ball ramp clutch with balls, and the balls can be accommodated in ball pockets at one end of the insertable clutch insert. By virtue of the functional decoupling, the clutch insert for the balls is thus easier to fashion than is the case in the prior art.

Provision is furthermore made for the clutch sleeve to have a thrust washer for the spring. To achieve this, it is advantageous if the internal profile of the sleeve forms an axial retainer for the thrust washer.

Various methods are possible for the production of the sleeve, e.g. a drawing process. In a preferred embodiment, the sleeve is designed as a rolled punched/bent part with a joint in the longitudinal direction. The joint can be a weld or positive-locking teeth, for example, but other embodiments are likewise possible.

A disc brake, in particular a pneumatically actuated disc brake, has an adjusting device in accordance with the above description.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a longitudinal sectional view of an illustrative embodiment of an adjusting device according to the invention;

FIG. 2 is an external view of the illustrative embodiment in accordance with FIG. 1;

DETAILED DESCRIPTION OF THE DRAWINGS

In the figures, components which have the same or similar functions are provided with the same reference signs.

Figure 5:
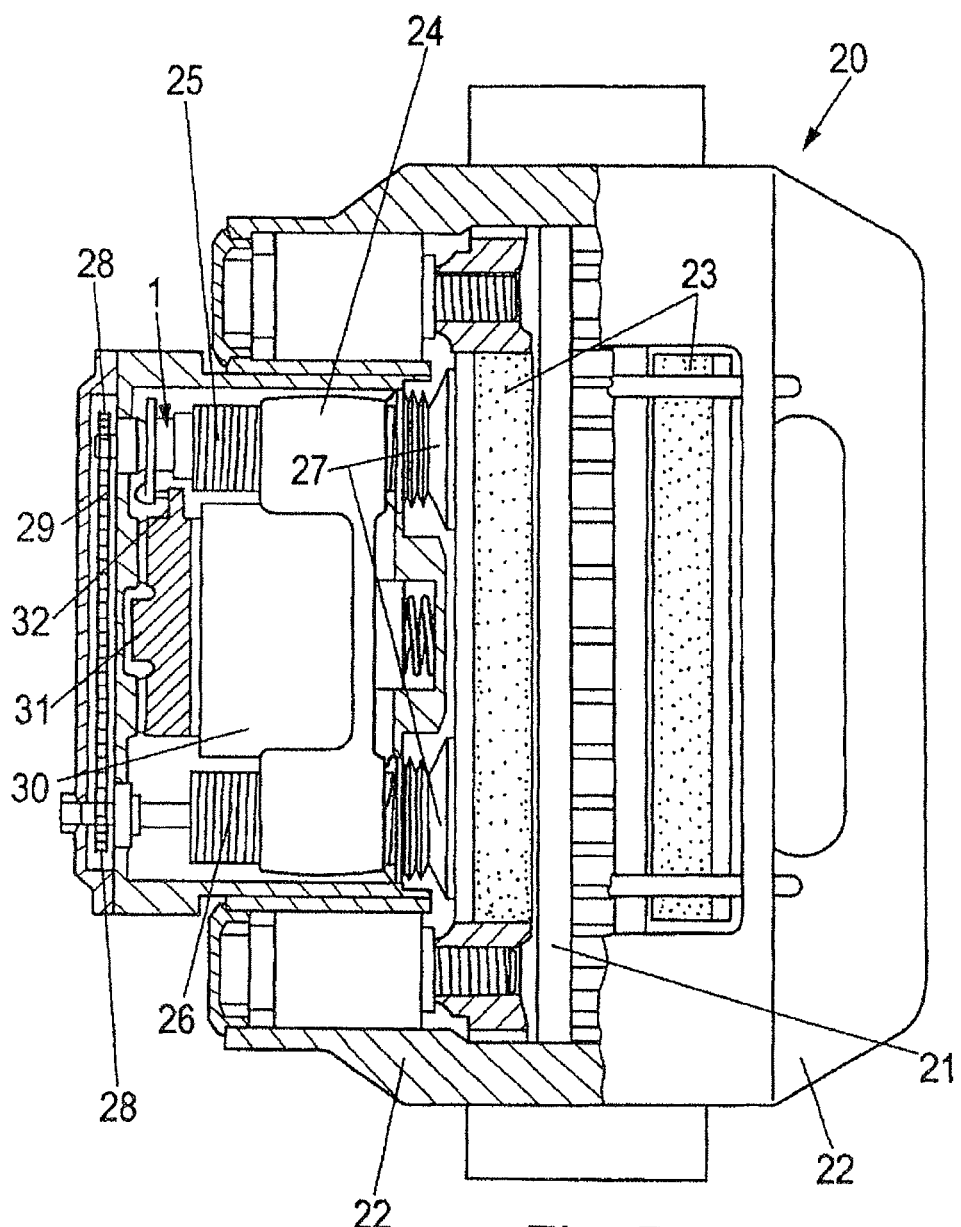
FIG. 5 is a schematic representation of a disc brake.

For the construction and operation of a pneumatic disc brake in accordance with FIG. 5, attention is drawn to the corresponding description of DE 197 29 024 C1. Here, the following components are indicated in FIG. 5: disc brake 20, brake disc 21, brake caliper 22, brake pads 23, cross-member (bridge) 24, actuating spindles 25 and 26, pressure pieces 27, chain sprockets 28, chain 29, eccentric 30 and rotary lever 31, which has a drive element 32 that interacts with an operating fork 5 of an adjusting device 1. Here, the adjusting device 1 is arranged in the actuating spindle 25. An adjusting device 1 of this kind will now be explained in greater detail. The adjusting device 1 would also be suitable for a disc brake operated by an electric motor.

FIG. 2 is a schematic representation of an illustrative embodiment of an adjusting device 1 according to the invention, and FIG. 1 shows a longitudinal section through the illustrative embodiment in accordance with FIG. 1.

The adjusting device 1 has the following components: a shaft 2 with a drive spigot 19 having appropriate profiling for a tool, and with a collar 18 at the upper end thereof; a bearing washer 3 for fixing the adjusting device 1 in the brake caliper 22 (see FIG. 5); a bushing 7, which axially adjoins the bearing washer 3 and carries a drive ring 6 that is connected to an operating fork 5, which is coupled to the drive element 32 (see FIG. 5) of the rotary lever 31; a load-changeable/overload clutch 8, which, in this example, is designed as a ball ramp clutch and interacts by way of balls 11 with a clutch insert 33 of a clutch sleeve 12; and a spring 15, which is disposed as a cylindrical spring in the clutch sleeve 12, between a thrust washer 40 and a profiled washer 16. The profiled washer 16 rests axially on a lip 17 of the shaft 2. The spring 15 serves to hold the elements of the adjusting device 1 together axially and to preload the load-changeable/overload clutch 8 and can be adjusted with a tool, e.g. by means of a profile on the collar 18, which is supported on the bearing washer 3 and interacts by way of a thread with the shaft 2 as an adjusting element. This is possible because the thrust washer 40 is fixed axially in the clutch sleeve 12.

The ball ramp clutch consists of a clutch bushing 9, which forms a lower end of bushing 7, balls 11 as rolling contact elements, and the clutch insert 33. The balls 11 are accommodated in ball pockets in the end of the clutch bushing 9 and in an end 34 (see FIG. 3) of the clutch insert 33.

Figure 4:
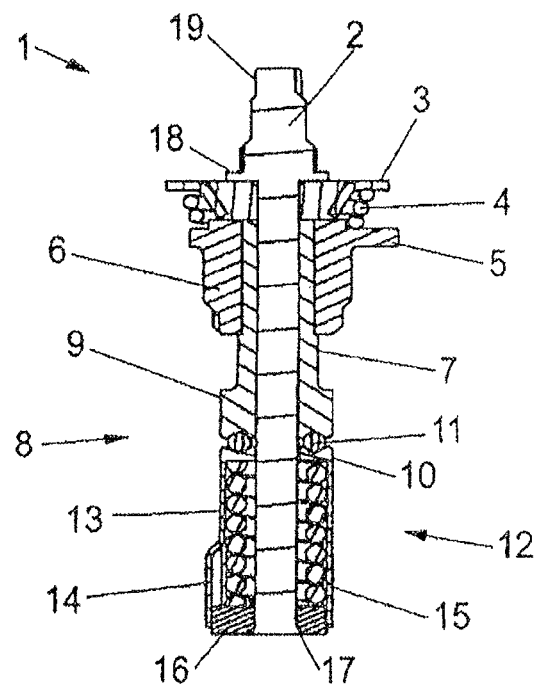
FIG. 4 is a schematic longitudinal section through a known adjusting device.

According to an embodiment of the invention, in contrast to the adjusting device in accordance with FIG. 4, which was described at the outset, the clutch sleeve 12 consists of two functional components. For this purpose, the clutch sleeve 12 has a sleeve 36 and the clutch insert 33, which can be inserted into the axial end of the sleeve 36 that points toward the load-changeable/overload clutch 8. The other axial end of the sleeve 36 is provided with ribs 14 which extend in the axial direction and are used to transmit torque to the actuating spindles 25, 26. In this illustrative embodiment, the sleeve 36 is of relatively thin-walled design. It can be a punched/bent part made of sheet metal, for example, which, after a forming process, is rolled into a sleeve and joined in the longitudinal direction by way of a joint 38. Here, the joint 38 is designed as positive-locking teeth, but could also be configured in some other way. It is likewise possible to produce the sleeve 36 as a drawn part.

Figure 3:
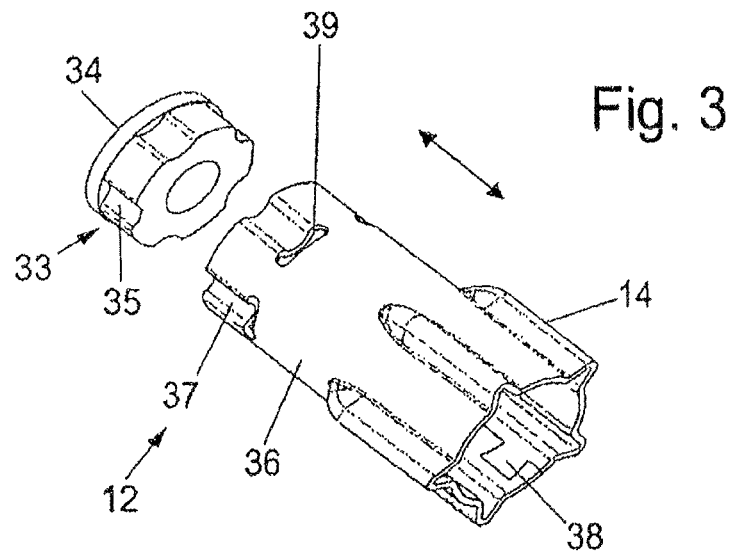
FIG. 3 is an enlarged perspective representation of a clutch sleeve in accordance with FIGS. 1 and 2.

The axial end of the sleeve 36 which points toward the load-changeable/overload clutch 8 is provided with an internal profile 37 that interacts with a corresponding external profile 35 on the clutch insert 33. In this connection, FIG. 3 shows a schematic perspective representation of the clutch sleeve 12 with sleeve 36 and with the clutch insert 33 not yet inserted. Here, the internal profile 37 of the sleeve 36 is formed by pressing wall sections of the sleeve end that are distributed around the circumference radially inward. For this purpose, recesses 39 are provided underneath the pressed-in wall sections, facilitating forming and allowing a uniform internal profile 23. The clutch insert 33 has corresponding recesses as an external profile 35. The profiles 35, 37 extend in the axial direction of the clutch sleeve 12, thereby making it possible to insert the clutch insert 33 into the sleeve 36 in the axial direction (double arrow) and to achieve a positive, rotationally secure fit. Here, an axial stop for the clutch insert 33 in the sleeve 36 is formed by an uninterrupted ring on the end 34 of the clutch insert 33.

The profiles 35, 37 permit easy insertion and removal of the clutch insert 33 and simple production. The recesses 39 furthermore make it possible to design the bottom edges of the pressed-in wall sections of the sleeve 36 in such a way that they form an axial stop for the thrust washer 40.

It is apparent from FIG. 3 that the sleeve 36 is of thin-walled design, and the clutch insert 33 can be dimensioned to match the function of the forces of the load-changeable/overload clutch 8 that are to be transmitted. Owing to the choice of a different material (e.g. a sintered part) from that of the sleeve 36, the clutch insert 33 can be fashioned in a correspondingly different way (e.g. by heat treatment) in order to form the running surfaces and the ball pockets for the balls 11, for example.

Thus, for example, the axial stop for the clutch insert 33 in the sleeve 36 can be formed by appropriate forming through pressing in the bottom edges of the recesses 39. It is also possible to fix the thrust washer 40 axially in the sleeve 36 in some other way, e.g. by means of beads in the sleeve wall. The external and internal profiles 35, 37 can also have different shapes, e.g. serrations or the like.

TABLE OF REFERENCE NUMERALS 1 adjusting device
2 shaft
3 bearing washer
4 compression spring
5 operating fork
6 drive ring
7 bushing
8 load-changeable/overload clutch
9 clutch bushing
10 clutch section
11 ball
12 clutch sleeve
13 sleeve body
14 rib
15 spring
16 profiled washer
17 lip
18 collar
19 drive spigot
20 disc brake
21 brake disc
22 brake caliper
23 brake pads
24 cross-member
25 first actuating spindle
26 second actuating spindle
27 pressure piece
28 chain sprockets
29 chain
30 eccentric
31 rotary lever
32 drive element
33 clutch insert
34 end
35 external profile
36 sleeve
37 internal profile
38 joint
39 recess
40 thrust washer The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjusting device for compensating wear of brake pads and a brake disc of a pneumatically actuated disc brake having a rotary lever brake application device, the adjusting device comprising:

a load-changeable/overload clutch having a bushing;
a drive ring disposed axially on the bushing;
a clutch sleeve having arranged therein a spring, the load-changeable/overload clutch being disposed axially between the drive ring and the clutch sleeve, wherein
the clutch sleeve comprises a sleeve and a clutch insert, the clutch insert being insertable axially into the sleeve in a positively engaging manner,
the clutch sleeve has a thrust washer for the spring, and
the internal profile of the sleeve has an axial retainer for the thrust washer.

2. The adjusting device according to claim 1, further comprising a bearing washer operatively configured to attach the adjusting device to a caliper of the disc brake.

3. The adjusting device according to claim 2, wherein the adjusting device is operatively configured to be insertable into an actuating spindle of the rotary lever brake application device.

4. The adjusting device according to claim 1, wherein the load-changeable/overload clutch is a ball ramp clutch having balls.

5. The adjusting device according to claim 4, wherein the clutch insert comprises ball pockets at one axial side, said ball pockets accommodating the balls of the ball ramp clutch.

6. The adjusting device according to claim 5, wherein the clutch insert has an external profile corresponding to an internal profile of the sleeve.

7. The adjusting device according to claim 6, wherein the clutch sleeve has a thrust washer for the spring.

8. The adjusting device according to claim 7, wherein the internal profile of the sleeve has an axial retainer for the thrust washer.

9. The adjusting device according to claim 8, wherein the sleeve is a rolled punched/bent part having a joint extending in a longitudinal direction.

10. The adjusting device according to claim 1, wherein the clutch insert has an external profile corresponding to an internal profile of the sleeve.

11. The adjusting device according to claim 1, wherein the sleeve is a rolled punched/bent part having a joint extending in a longitudinal direction.

12. A disc brake for use with a brake disc, comprising:
a caliper;
a rotary lever brake application device arranged in the caliper, the rotary lever brake application device having at least one threaded spindle;
an adjusting device for compensating wear of brake pads and the brake disc of the disc brake, the adjusting device being operatively arranged in the threaded spindle and attached to the caliper via a bearing washer; and
wherein the adjusting device comprises:
a drive ring disposed axially on a bushing of a load-changeable/overload clutch, the load-changeable/overload clutch being disposed axially between the drive ring and a clutch sleeve for a spring,
a sleeve and a clutch insert of the clutch sleeve, the clutch insert being inserted axially into the sleeve in a positively engaging manner,
the clutch sleeve has a thrust washer for the spring, and
the internal profile of the sleeve has an axial retainer for the thrust washer.

13. The disc brake according to claim 12, wherein the disc brake is a pneumatically actuated disc brake.

14. The disc brake according to claim 12, wherein the load-changeable/overload clutch is a ball ramp clutch having balls.

15. The disc brake according to claim 14, wherein the clutch insert comprises ball pockets at one axial side, said ball pockets accommodating the balls of the ball ramp clutch.

16. The disc brake according to claim 12, wherein the clutch insert has an external profile corresponding to an internal profile of the sleeve.

17. An adjusting device for compensating wear of brake pads and a brake disc of a pneumatically actuated disc brake having a rotary lever brake application device, the adjusting device comprising:
- a load-changeable/overload clutch having a bushing;
- a drive ring disposed axially on the bushing;
- a clutch sleeve having arranged therein a spring, the load-changeable/overload clutch being disposed axially between the drive ring and the clutch sleeve, wherein
- the clutch sleeve comprises a sleeve and a clutch insert, the clutch insert being insertable axially into the sleeve in a positively engaging manner,
- the load-changeable/overload clutch is a ball ramp clutch having balls,
- the clutch insert comprises ball pockets at one axial side, said ball pockets accommodating the balls of the ball ramp clutch,
- the clutch insert has an external profile corresponding to an internal profile of the sleeve,
- the clutch sleeve has a thrust washer for the spring, and
- the internal profile of the sleeve has an axial retainer for the thrust washer.

18. The adjusting device according to claim 17, wherein the sleeve is a rolled punched/bent part having a joint extending in a longitudinal direction.

\* \* \* \* \*